United States Patent [19]

Haas

[11] Patent Number: 5,570,089
[45] Date of Patent: Oct. 29, 1996

[54] METHOD AND APPARATUS FOR PROVIDING DATA STREAM FOR COST EFFECTIVE TRANSMISSION LINKS

[75] Inventor: Lee C. Haas, Raleigh, N.C.

[73] Assignee: International Business Machines Corporation, Armonk, N.Y.

[21] Appl. No.: 197,090

[22] Filed: Feb. 16, 1994

[51] Int. Cl.⁶ .............................. H04L 25/49; G11B 11/00
[52] U.S. Cl. ................................. 341/102; 341/58; 341/68
[58] Field of Search ............................... 341/58, 59, 106, 341/95, 102

[56] References Cited

U.S. PATENT DOCUMENTS

| | | | |
|---|---|---|---|
| 5,018,142 | 5/1991 | Simcoe | 370/112 |
| 5,420,583 | 5/1995 | Knecht | 341/59 |

Primary Examiner—Jeffrey A. Gaffin
Assistant Examiner—Peguy JeanPierre
Attorney, Agent, or Firm—Joscelyn G. Cockburn; Jeanine S. Ray-Yarletts; Stephen T. Keohane

[57] ABSTRACT

A system and method for encoding and decoding binary data for serial transmission over a physical medium provides a highly efficient and less complex coding scheme while guaranteeing clocking information and guaranteeing an NRZ(I)-disparity of no greater than one per five-bit word. The system and method of the present invention comprise a 4/5 encoder which enables each nibble to be encoded and decoded independently from one another. The coding system and method of the present invention guarantees an NRZ(I)-disparity having a magnitude of no greater than one for any word after NRZ(I) while providing at least one word with "NRZ(I) comma" property.

2 Claims, 4 Drawing Sheets

METHOD AND APPARATUS FOR PROVIDING DATA STREAM FOR COST EFFECTIVE TRANSMISSION LINKS

BACKGROUND OF THE INVENTION

I. Field of the Invention

The present invention relates to data communications and, more particularly, to a new method of encoding and decoding binary data and non-data signals for transmission over a serial data link that is lower in complexity and higher in efficiency and has a desirable data pattern.

II. Background and Prior Art

In a digital data transmission system, binary data, representing some form of information, is encoded in digital form for transmission over the network. For instance, in pulse code modulation (PCM) systems, which are in wide-spread use in the U. S. telephony network, analog voice signals are quantized into a number of discrete levels and also use a code to designate each level at each sample time. This results in a string of binary data, i.e., "0's and 1's", representing the transmitted voice signal. In a standard data transmission setting, such as in a local area network (LAN), data from one node in the LAN in the form of a string of binary digits is conveyed to another node connected to the LAN. The characteristics of the transmitted data string varies according to the prescribed protocol that is being conformed to.

Choice of the protocol to be used may depend on a number of factors, such as the type of modulation/demodulation to be used (in long distance communication), constraints on bandwidth, receiver complexity, etc. In any case, the binary data must be represented so that it has electrical characteristics appropriate for transmission over a transmission medium, such as a twisted pair of copper wire. For example, it is advantageous for the coding scheme employed to be self-clocking: i.e., the clock frequency is easily found from the pulse code. Receivers are more able to synchronize to the transmitted data where the data is coded in a scheme having a self-clocking feature.

It is also advantageous for the average value of the transmitted binary data string to be zero volts (i.e., that the data string be symmetrical, or have low or zero "disparity"). An example of a string having an average value of zero volts is one where the cumulative positive voltage is equal to the cumulative negative voltage. In cases where there is high disparity (i.e., many more bits of one polarity than the other), the interaction between high pass circuit components in the transmission path and the low frequency energy in long bit sequences may cause the low frequency energy of the bit string to be filtered out causing data loss.

These problems (i.e., high disparity, etc. ) are especially apparent where the data to be transmitted is in a high-speed data transmission system (e.g., a LAN or an ATM network) where the digital binary information stream of data to be transmitted rarely has the characteristics appropriate for available, cost effective transmission links. Typically, the information to be transmitted in such an environment is either very random in nature, or it is very repetitive. These characteristics (a high degree of randomness or repetitiveness) have undesirable properties for high speed transmission.

Random data, such as compressed data and encrypted data, has the characteristic that any given sequence of bits in a random bit stream is equally likely to occur as any other sequence. For example, a string of ten 1's in a row is expected to occur on the average of once out of every 1024 ($2^{10}$) strings of ten bits. This is true for any other string of ten bits.

The problem is that long strings of bits without transitions have an adverse effect on the performance of data transmission. This occurs for two reasons. One reason is that clock recovery circuits perform poorly in the absences of bit transitions. Another reason is the high disparity causing the interaction between high pass circuit components in the transmission path and the low frequency energy in long bit sequences discussed above.

Repetitive data, or data that contains strings of repeated sequences of bits, give rise to concentrating the frequency spectrum of the transmitted signal to a few frequency ranges or worse, to a single frequency range. (A string of repetitive data may occur where data representing a screen display is transmitted over the network and where one string of bits represents a particular background color of the screen.) This condition often creates severe problems in EMC compliance (with the FCC) for data transmission products for wire cable during design, development and manufacturing. Furthermore, concentration of energy in limited frequency ranges often reduces the effectiveness of clock recovery in the receiver thereby contributing to lower product performance.

A variety of methods for representing binary data for transmission over the physical media have been employed for solving some of these problems. Some examples of media level encoding schemes are Manchester split phase encoding, Manchester differential split phase encoding, and nonreturn-to-zero encoding. An example of each of these encoding schemes is illustrated in FIG. 1.

The widely used Manchester encoding scheme (split phase) eliminates the variation in average value (or disparity) using symmetry. In the Manchester split-phase method, a 1 is represented by a 1 level during the first ½-bit interval, then shifted to the 0 level for the latter ½-bit interval; a 0 is represented by the reverse representation. Similarly, in the split-phase (differential Manchester) method, a similar symmetric representation is used except that a phase reversal relative to the previous phase indicates a 1 (i.e., mark) and no change in phase is used to indicate a 0.

Another widely-employed media-level encoding method is the nonreturn-to-zero (NRZ) representation which reduces bandwidth needed to send any type of data. In the NRZ representation, a bit pulse remains in one of its two levels for the entire bit interval. In the NRZ(M) method, a level change is used to indicate a mark (i.e., a 1) and no level change for a 0; the NRZ(S) method uses the same scheme except that a level change is used to indicate a space (i.e., a 0). Both of these examples (NRZ(M) and NRZ(S)) are examples of the more general classification NRZ(I) in which a level change (inversion) is used to indicate one kind of binary digit and no level change indicates the other digit.) The NRZ representations are efficient in terms of bandwidth required and are widely used.

However, the use of split-phase (Manchester and mark) and the NRZ media-level representations require some added receiver complexity to determine clock frequency.

Each of these methods discussed (i.e., split phase Manchester, NRZ(I), etc.) are methods of encoding single bits of information for transmission on a physical medium. For instance, in differential Manchester split phase, each information bit is represented by two "line bits". As shown in FIG. 1, the first information bit "a", having a value of 1, is represented by a high ("1") going to a low ("0"), the high being the first line bit, the low being the second line bit. The second information bit "b", also having a value of 1, is represented by a low ("0") going to a high ("1").

In this particular type of encoding, the line bits representing the information bits are dependent upon the previous line bit. This is called "differential" or "inversion" encoding. For instance, in this example, an information bit having the value of 1 is represented by a two line bits having a transition from the previous state. So, as the first information bit ("a") has a value of 1 and is represented by a high going low, the second information bit ("b") having a value also of 1 is represented by a low going high, a transition from the previous line bit pair. The following information bit "c" has a value of 1 and is represented by a high going low, a transition from the previous line bit pair. The information bit "d" has a value of 0 and is represented by a high going low, no transition from the previous line bit pair. This type of inversionary or differential encoding has the advantage of, among other things, being tolerant if two lines in a twisted pair become inadvertently swapped.

As was discussed the differential Manchester split phase and both of the NRZ(I) media-level encoding schemes (i.e., NRZ(M) and NRZ(S)) are differential or inversionary media-level schemes. The NRZ(I) schemes, however, allow for higher bandwidth transmission as less clock cycles are required. One of the drawbacks with the NRZ(I) media-level encoding is that it does not guarantee symmetry as does the Manchester encoding schemes. Furthermore, it does not guarantee clocking information so that the receiver may synchronize with the transmitter (i.e., it is conceivable that a string of line bits having the same value is transmitted, such as all 1's, thus throwing off the receiver clock phase lock loop). Thus, if NRZ(I) is to be used, an encoding scheme above the media-level must be used so that parity is ensured or maximized and so that clocking information is provided in a timely manner.

Various types of these encoding schemes which "sit on top" of these media-level encoding schemes (in a conceptual layered structure) have been used in the past to take advantage of the media-level encoding schemes strengths. For instance, IBM developed an encoding scheme called the 8/10 encoding scheme where 8 bits of data is encoded into 10-bit words for transmission over the network. (Subsequently, these 10-bit words need to be encoded in one of the media-level encoding scheme, such as NRZ(M) for transmission over the network.) As was discussed, the purpose of this scheme is to guarantee sufficient clocking information while maintaining minimal disparity. However, of the possible 1024 ($2^{10}$) 10-bit words (to map to the 256 8-bit words), only 252 have zero disparity, i.e., the same number of 1's and 0's. For example, the 10-bit word "1010101010" has zero disparity as it has the same number of 0's and 1's. On the other hand, the 10-bit word "1010101011" has a disparity of two in that there are two more 1's than 0's. Thus, in order to make up for the "missing" four 10-bit words (i.e., 256 required minus 252 available), the 8/10 coding scheme uses some complicated logic and requirements so that disparity is minimized. Furthermore, due to the shear number of possible encoded words, the 8/10 code and logic is quite complex.

Another encoding scheme was developed by Advanced Micro Devices (AMD) for its TAXIchip. integrated circuits. This is described in Advanced Micro Devices TAXIchip Integrated Circuits Technical Manual, Preliminary Rev. 1.2, 1989. This is further described in U.S. Pat. No. 4,987,572, assigned to Advanced Micro Devices. The AMD encoding scheme defines a 4/5 and a 5/6 code. In the 4/5 code, a 4-bit word (or "nibble") is received by the chip and encoded into a 5-bit word. Likewise, in the 5/6 code, a 5-bit word is encoded by the chip into a 6-bit word. Again, this is done for the purpose of including clocking information in the data stream while minimizing disparity.

However, using the AMD coding scheme, a disparity of three (i.e., in five bits, four bits are one polarity while the remaining bit is the other) is possible so that DC balance is not maintained. This DC offset can affect the transmitting data integrity as well as increasing jitter. For example, in a 1-byte code transmission, a 40% DC offset can occur due to the disparity.

Furthermore, the AMD coding scheme does not provide a single 5-bit word having "comma" property so that the receiver may synchronize its decoding circuitry. (A word having "comma" property is one where the particular string representing the word can never be inadvertently duplicated in the data stream by, for instance, two words sitting side-by-side, the ending of the first word and the beginning of the second word comprising the particular string. ) Instead, two words defined by AMD are required so that the receiver may get in sync.

There is needed a coding scheme which solves the above identified problems by providing an ideal balance between complexity, efficiency, function and performance.

SUMMARY OF THE INVENTION

A system and method for encoding and decoding binary data for serial transmission over a physical medium provides a highly efficient and less complex coding scheme while guaranteeing clocking information and guaranteeing a disparity of no greater than one per five-bit word. The system and method of the present invention comprise a 4/5 encoder which enables each nibble to be encoded and decoded independently from one another. The coding system and method of the present invention guarantees an NRZ(I)-disparity having a magnitude of no greater than one for any word after NRZ(I) while providing at least one word with "NRZ(I) comma" property.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

The system and method of the present invention provides for the transmission of data in a format suitable for use in a high speed serial link, such as in an asynchronous transfer mode (ATM) network. The system and method of the present invention further provides for the receipt of serially transmitted formatted data and decoding the received data.

Using the system and method of the present invention, data actually transmitted on the medium has a disparity of no greater than one so that DC offset and corresponding jitter is minimized. Furthermore, using the encoder patterns of the present invention, at least one word has "NRZ(I) comma" property so that the receiver may synchronize its decoder.

Figure 2:
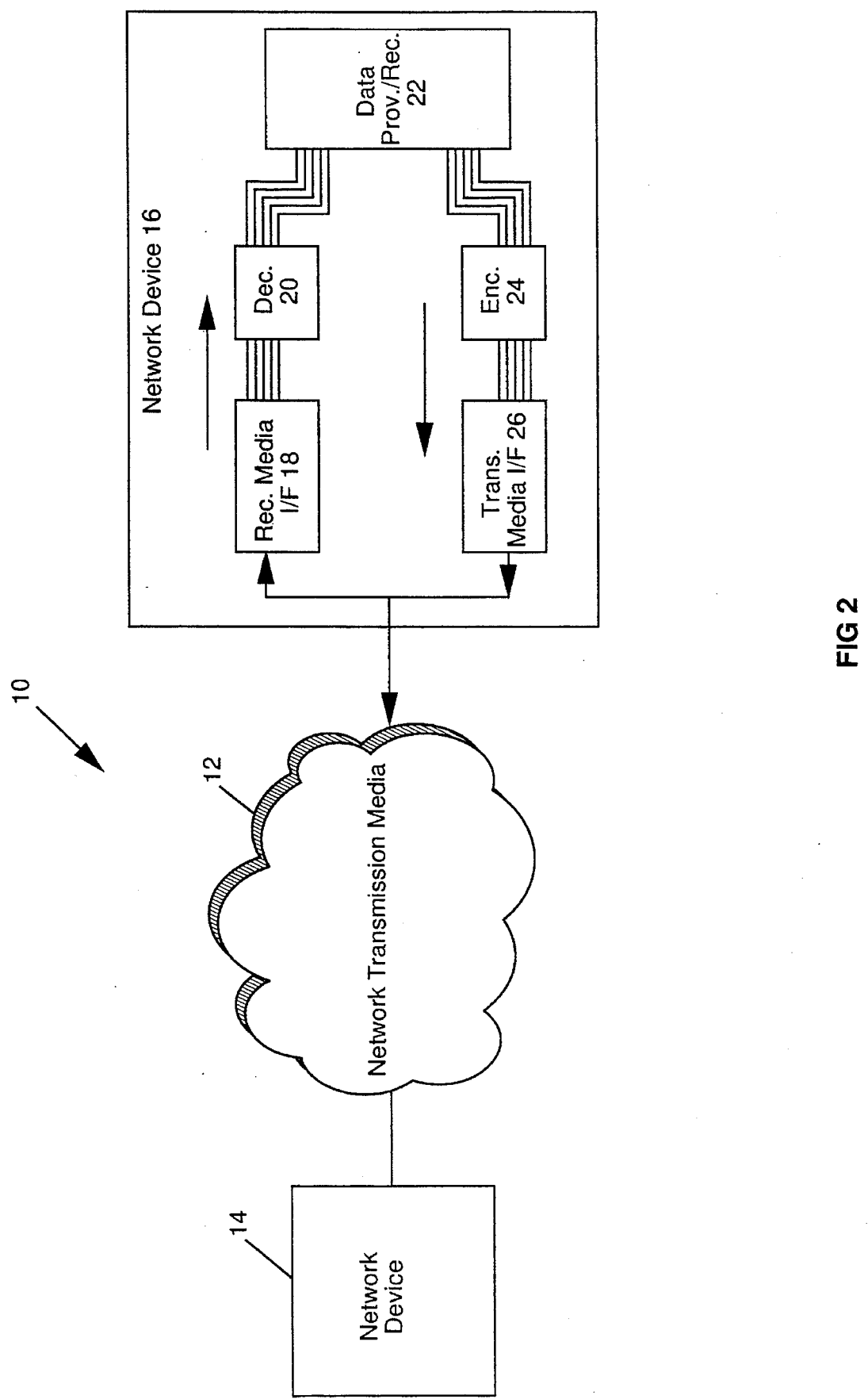
FIG. 2 depicts a network comprising a network device utilizing the coding system and method of the present invention.

FIG. 2 illustrates in block diagram form a communications network 10 comprising a network transmission media 12 and network devices 14 and 16. Network device 16 is shown in slightly greater detail as having a receiving media interface 18, a decoder 20, a data provider/receiver 22, an encoder 24 and a transmitting media interface 26.

The receiving media interface 18 acts to interface the circuitry of network device 16 to the network 12. It performs functions such as receiving a transmitted bit stream, recovering the clock of the transmitting unit so that the receiver may synchronize with the transmitter, and forwarding the received data stream and clock to the decoder 20. In addition, the receiving media interface 18 converts the received data from the media-level encoding scheme, nonreturn-to-zero inversion (NRZ(I)), to NRZ form and further from a serial form to a 5-bit format.

The decoder 20 receives the 5-bit word from the receiving media interface (as shown by the direction arrow) and decodes the word to generate a 4-bit nibble plus a non-data bit. This 4-bit nibble and non-data bit is forwarded to the data provider/receiver 22.

The data provider/receiver 22 is the "customer" in this environment. It is merely providing binary data to be transmitted across the network or receiving binary data which was conveyed to it via the network. It does not care how the data is transmitted or received. In the present example, the data provider/receiver 22 is configured to receive and transmit binary data in a 4-bit parallel format plus an additional non-data bit. This is used merely for illustration as other formats may be implemented. Furthermore, the data provider/receiver 22 is merely a logical representation of any unit wishing to send data over network transmission media 12 using network device 16. It may actually be any communication device, possibly receiving data on one side in one format and reformatting it into the 4-bit nibble plus escape format on the other. For instance, the data provider/receiver may be a router attached to a LAN.

Encoder 24 receives the 4-bit nibble and non-data bit from the provider/receiver 22 and encodes it to a 5-bit word to be conveyed to the transmitting media interface 26. The encoder 24 performs, in effect, the opposite function of decoder 20.

The transmitting media interface 26 receives the 5-bit word (as shown by the direction arrow) and converts it from a parallel into a serial form, converts it from NRZ to NRZ(I) form, and provides the physical media interface through the use of line drivers and the like.

Figure 3:
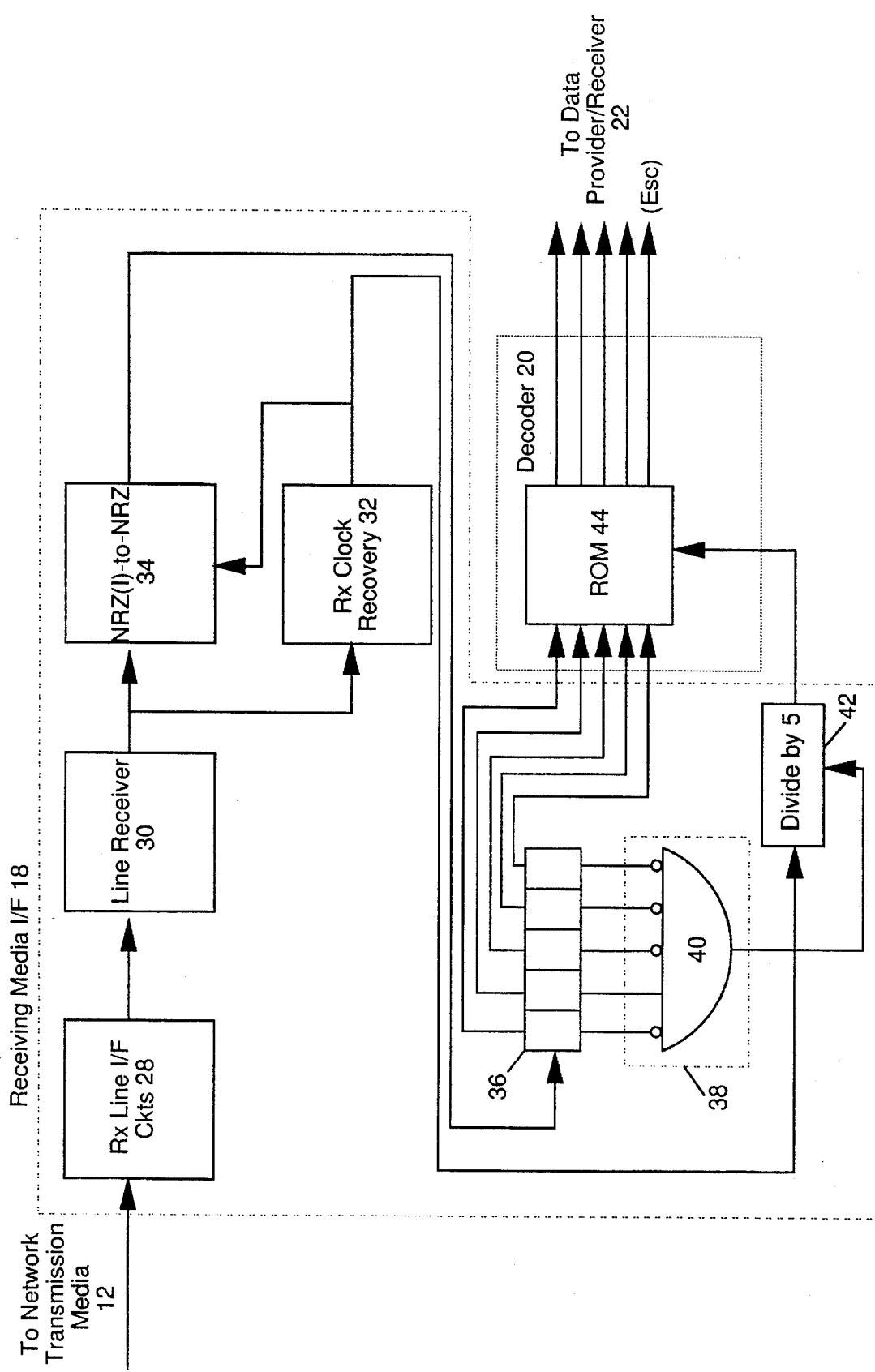
FIG. 3 depicts, in block diagram form, one embodiment of the encoder and the transmitting media interface of the present invention.

FIG. 3 illustrates the receiving media interface 18 and the decoder 20 in greater detail. The receiving media interface 18 receives the serial data stream using interface circuitry ("Rx Line I/F Ckts" 28 and line receivers 30) conforming to the physical media protocol used. The interface circuitry converts the data stream into a form usable by the remainder of the system.

The received data stream is conveyed to both receiver clock recovery circuitry 32 and NRZ(I)-to-NRZ circuitry 34. The receiver clock recovery circuitry 32 recovers the transmitter clock. A common method of clock recovery employs phase-lock loop techniques. The transmitter clock is used to synchronize the remaining portion of the receiver circuitry. The NRZ(I)-to-NRZ circuitry 34 converts the NRZ(I) code to an NRZ form. For instance, in NRZ(I), an inversionary media-level encoding scheme, the various line transitions or line bits are converted into a standard level form where, for example, a high level signal represents a 1 and a low level signal represents a 0.

The received bit clock is forwarded to both a deserializer 36 and a +5 circuit 42. The +5 circuit 42 divides the received bit clock by 5 to synchronize the receiver for 5-bit words.

The converted data stream is conveyed from the NRZ-to-NRZ(I) circuitry 34 to the deserializer 36. The data stream is clocked into the deserializer 36 using the received bit clock. The deserializer 36 merely changes the received data from serial to parallel form. The parallel form data (in 5-bit format) is conveyed to the decoder 20 and to a comma detect 38.

The comma detect 38 examines the bit stream in the form a 5-bit words, the bits individually cycling through the deserializer 36. In the example shown, a 5-port AND gate 40 is used where the 5-bit word is "0 0 0 1 0". This is the 5-bit word having NRZ(I) comma property. As was discussed above, this 5-bit string will appear no where else in the data stream and is unique only to this word. 5-bit strings representing each of the other words in the preferred encoder pattern set can appear in the data stream even where the particular 5-bit word is not transmitted. For instance, two bits at the end of one word together with the first three bits of another word may form one of the specified 5-bit words in the encoder pattern set. That can never happen with the NRZ(I) comma property word. Thus, the NRZ(I) comma property word is able to synchronize the receiver for receiving the transmitted 5-bit words. The output of the comma detect 38 is input to strobe the +5 circuit 42. This synchronized receiver clock is conveyed to the decoder 20.

Decoder 20 receives the 5-bit words, synchronized by the receiver clock, and decodes the words in accordance with the preferred coding pattern shown in Table 1 below. (The mapping shown below may be redefined so that the code word maps to another data nibble and still remain functionally equivalent so long as these 17 code words are used to represent the 16 data words plus the one non-data word "escape".)

TABLE 1

Decode Table

| | Code Word | Data Nibble |
|---|---|---|
| 00 | 1 1 1 1 1 | 0 0 0 0 |
| 01 | 1 0 1 1 1 | 0 0 0 1 |
| 02 | 1 1 1 0 1 | 0 0 1 0 |
| 03 | 1 0 1 0 1 | 0 0 1 1 |
| 04 | 1 1 0 1 0 | 0 1 0 0 |
| 05 | 1 0 0 1 0 | 0 1 0 1 |
| 06 | 1 1 0 0 1 | 0 1 1 0 |
| 07 | 1 1 0 1 1 | 0 1 1 1 |
| 08 | 0 1 1 1 0 | 1 0 0 0 |
| 09 | 0 0 1 1 1 | 1 0 0 1 |
| 10 | 0 1 1 0 1 | 1 0 1 0 |
| 11 | 0 1 1 1 1 | 1 0 1 1 |
| 12 | 0 1 0 1 0 | 1 1 0 0 |
| 13 | (0 0 0 1 0) | 1 1 0 1 |
| 14 | 0 1 0 0 1 | 1 1 1 0 |
| 15 | 0 1 0 1 1 | 1 1 1 1 |
| | 1 1 1 1 0 | Escape |

These code words have the requisite transmission properties when encoded in NRZ(I) (or another inversionary, or differential, type of media-level encoding scheme). This will discussed in greater detail in relation to the encoder description.

The decoder 20, which may be a ROM 44 or logic circuitry, decodes the 5-bit code words into the 4-bit data nibbles understandable by the data provider/receiver 22. The decoded 4-bit nibbles plus the non-data escape bit is conveyed to the data provider/receiver.

Figure 4:
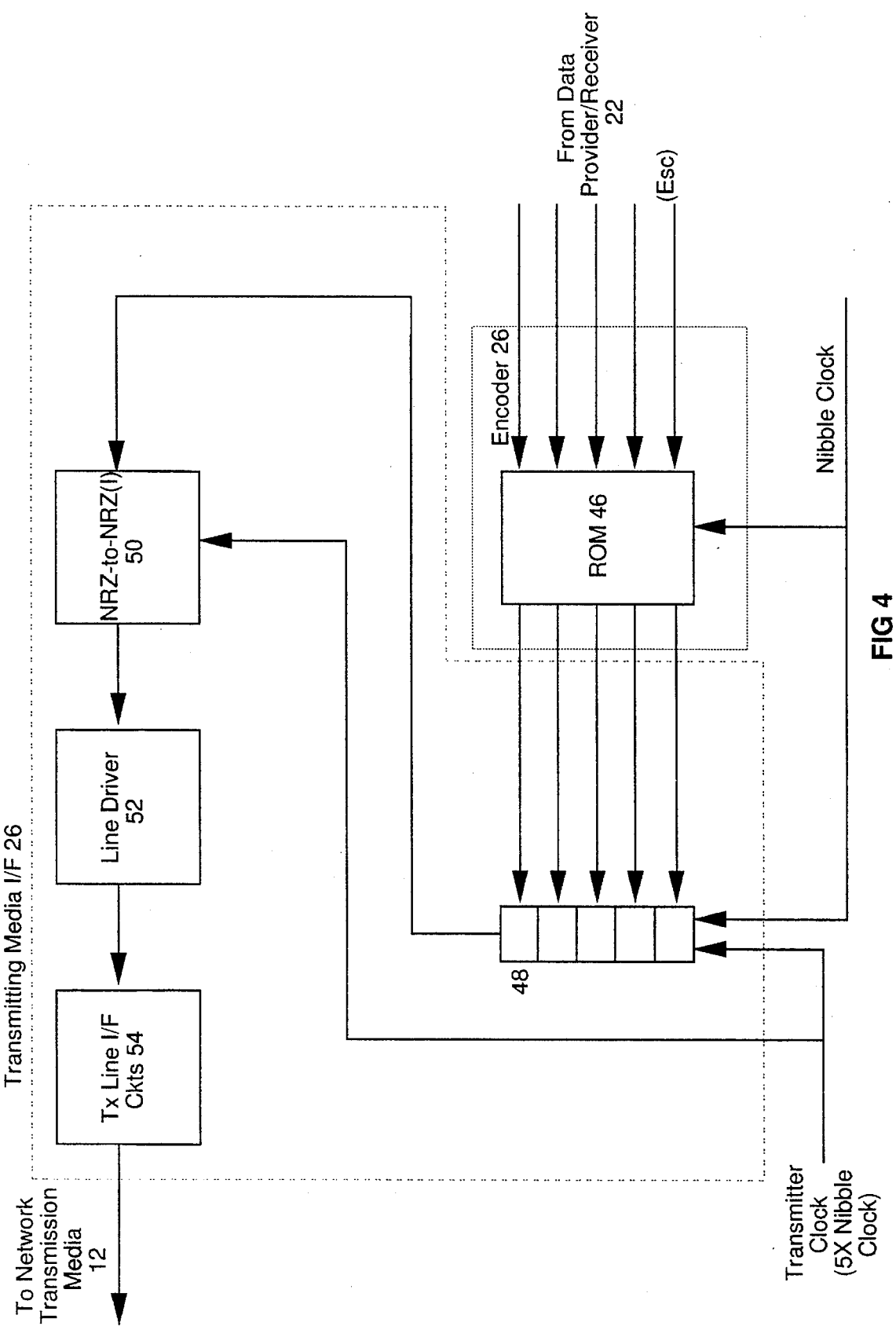
FIG. 4 depicts, in block diagram form, one embodiment of the decoder and the receiving media interface of the present invention.

In the other direction, when the data provider/receiver 22 wishes to transmit data over the network 12, 4-bit nibbles plus an escape bit are conveyed to encoder 24. Encoder 24 is illustrated in block diagram form in FIG. 4.

As can be seen, the encoder 24 receives the 4-bit nibbles and the escape bit from the data provider/receiver 22. The encoder 24 encodes each of the 16 received 4-bit nibbles into a corresponding 5-bit word in accordance with the encoding pattern shown in Table 2 below using, for example, look-up table in a ROM 46. In addition, the escape bit is encoded into a 5-bit word so that 17 5-bit words are defined for the corresponding 16 data nibbles and the single escape bit. As can be seen, data nibble 13, or "1 1 0 1", is encoded to the NRZ(I) comma property word "0 0 0 1 0".

TABLE 2

| Encode Table | | Actual Line Signal | |
|---|---|---|---|
| | | Line Signal | Line Signal |
| Data Nibble | Code Word | Prior bit (0) | Prior bit (1) |
| 00 0 0 0 0 | 1 1 1 1 1 | 1 0 1 0 1 | 0 1 0 1 0 |
| 01 0 0 0 1 | 1 0 1 1 1 | 1 1 0 1 0 | 0 0 1 0 1 |
| 02 0 0 1 0 | 1 1 1 0 1 | 1 0 1 1 0 | 0 1 0 0 1 |
| 03 0 0 1 1 | 1 0 1 0 1 | 1 1 0 0 1 | 0 0 1 1 0 |
| 04 0 1 0 0 | 1 1 0 1 0 | 1 0 0 1 1 | 0 1 1 0 0 |
| 05 0 1 0 1 | 1 0 0 1 0 | 1 1 1 0 0 | 0 0 0 1 1 |
| 06 0 1 1 0 | 1 1 0 0 1 | 1 0 0 0 1 | 0 1 1 1 0 |
| 07 0 1 1 1 | 1 1 0 1 1 | 1 0 0 1 0 | 0 1 1 0 1 |
| 08 1 0 0 0 | 0 1 1 1 0 | 0 1 0 1 1 | 1 0 1 0 0 |
| 09 1 0 0 1 | 0 0 1 1 1 | 0 0 1 0 1 | 1 1 0 1 0 |
| 10 1 0 1 0 | 0 1 1 0 1 | 0 1 0 0 1 | 1 0 1 1 0 |
| 11 1 0 1 1 | 0 1 1 1 1 | 0 1 0 1 0 | 1 0 1 0 1 |
| 12 1 1 0 0 | 0 1 0 1 0 | 0 1 1 0 0 | 1 0 0 1 1 |
| 13 1 1 0 1 | (0 0 0 1 0) | 0 0 0 1 1 | 1 1 1 0 0 |
| 14 1 1 1 0 | 0 1 0 0 1 | 0 1 1 1 0 | 1 0 0 0 1 |
| 15 1 1 1 1 | 0 1 0 1 1 | 0 1 1 0 1 | 1 0 0 1 0 |
| Escape | 1 1 1 1 0 | 1 0 1 0 0 | 0 1 0 1 1 |

In addition, Table 2 details the actual line signal values after each of the 5-bit words is converted to NRZ(I) format and is transmitted over a physical medium. Because the media-level encoding scheme to be used is an inversionary or differential encoding scheme, there are two possible outcomes for actual line signal values for each of the 5-bit data words, each bit of the second possible outcome being the opposite in digital value than its counterpart in the first possible outcome.

Figure 1:
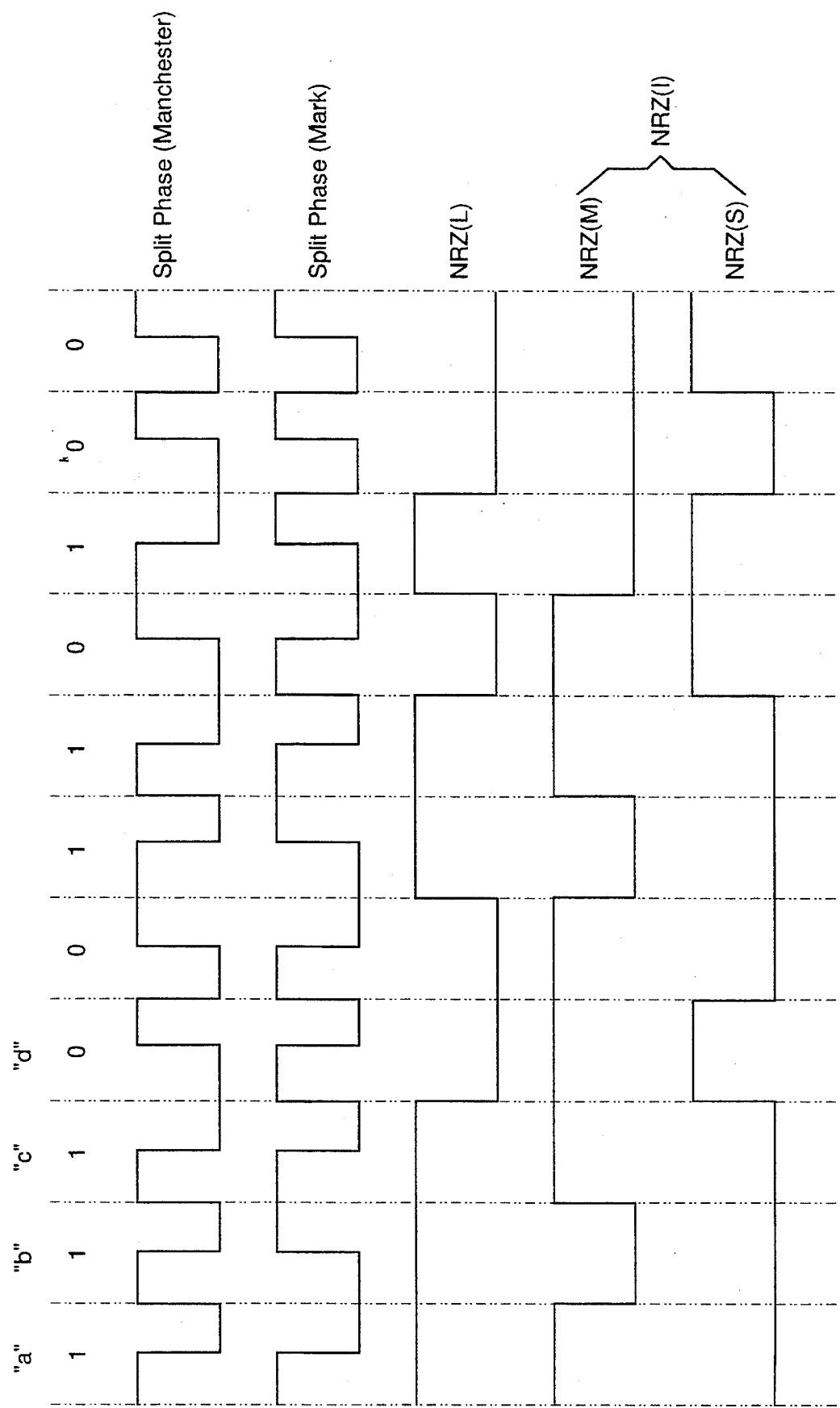
FIG. 1 depicts examples of binary data representations using prior art media-level coding methods.

Careful examination of the table shows that the disparity of the code words which have been translated to an NRZ(I) format never exceeds one in that there is always three of one digital value and two of the other. This ensures that DC balance is maintained so that the transmitting data integrity is maximized as well as minimizing jitter. Furthermore, there is a high transition density, i.e., average of 3.1 transitions per 5 signal elements. Further, the run length of any set of uninterrupted 1's or 0's never exceeds 5. This allows for easy receiving unit synchronization. Finally, one of the code words after NRZ(I) translation ("0 0 0 1 0") has NRZ(I) comma property because this sequence of bits will never occur as any part of any combination of other code words. The NRZ(I) comma property allows a receiver to immediately acquire code word synchronization by a simple 5-bit pattern match (as shown in the comma detect 38), whenever the word is used. The code words of the preferred code set having the characteristic of having an NRZ(I)-disparity of 1 when translated to NRZ(I) format shall be deemed for the purposes of this document as having an "NRZ(I)-disparity" of 1. The code word of the preferred code set having the comma property when translated to NRZ(I) format shall be deemed for the purposes of this document as having an "NRZ(I)-comma property". (As shown in FIG. 1, the NRZ(I) format may be either mark or space.

The preferred coding scheme was designed to provide for octet transmission which occurs, among other environments, in LAN transmission subsystems. For instance, a data nibble followed by an escape nibble may indicate one of the 16 commands symbols. Command sequences can then be identified with each of the 16 nibbles as required for each protocol. Further, two escape nibbles in sequence may have special significance such as representing a null symbol which supports systems that require an idle symbol. Finally, octet framing can be accomplished by establishing the convention of positioning all escape symbols immediately following a completed octet. This permits the receiver to easily establish the octet boundaries.

The output of the encoder 24 (5-bits) is conveyed to the transmitting media interface 26. The parallel data word is converted into serial form by a serializer 48 which merely puts the 5-bit word in serial format. The serial data stream is clocked out of the serializer 48 by a transmitter clock (which is 5 times the nibble clock which clocks the data into the serializer 48) to the NRZ-to-NRZ(I) circuitry 50 which converts the NRZ form of data stream to the NRZ(I) form for transmission over the network 12. Line driver 52 and Tx Line I/F Ckts 54 prepare the data stream for the actual physical interface so that it has proper voltage values, output impedance, etc.

Thus, it can be seen that the method and system of the present invention provides for encoding and decoding binary data for serial transmission over a physical medium in a highly efficient and less complex manner while guaranteeing clocking information and guaranteeing an NRZ(I)-disparity of no greater than one per five-bit word. The 4/5 encoder enables each nibble to be encoded and decoded independently from one another while guarantying an NRZ(I)-disparity having a magnitude of no greater than one for any word after NRZ(I) while providing at least one word with "NRZ(I) comma" property. While the invention has been particularly shown and described with reference to preferred embodiments thereof, it will be understood by those skilled in the art that various other changes in form and detail may be made without departing from the spirit and scope of the invention.

What is claimed is:

1. A method of converting from a first code set to a second code set comprising the steps of:

grouping said first code set into groups of a non-data bit and n bits;

converting each group of n bits into a corresponding group of n+a bits, where each group of n+a bits is selected from $2^{n+a}$ options, where each selected group of n+a bits has the characteristic of having a disparity of less than or equal to 1, and where at least one selected Group of n+a bits has comma property; and converting said non-data bit into a corresponding group of n+a bits.

2. A system for converting from a first code set to a second code set comprising:

means for grouping said first code set into groups of a non-data bit and n bits:

means for converting each group of n bits into a corresponding group of n+a bits, where each group of n+a bits is selected from $2^{n+a}$ options, where each selected group of n+a bits has the characteristic of having a disparity of less than or equal to 1, and where at least one selected group of n+a bits has comma property; and means for converting said non-data bit into a corresponding group of n+a bits.

* * * * *